United States Patent [19]

Miller

[11] 3,964,508
[45] June 22, 1976

[54] SAFETY CAP ASSEMBLY FOR PRESSURIZED VESSELS

[75] Inventor: Galen R. Miller, Tallmadge, Ohio

[73] Assignee: Chemidyne Corporation, Macedonia, Ohio

[22] Filed: July 17, 1974

[21] Appl. No.: 489,266

[52] U.S. Cl. .................. 137/377; 220/85 P; 220/366; 220/367
[51] Int. Cl.² ................... B65D 51/16; F16P 1/00
[58] Field of Search ............. 137/382, 382.5, 377; 251/351; 220/202, 204, 206, 208, 303, 360, 361, 366, 367, 85 P, 375, 316, 288; 215/307, 309–312; 138/89; 292/DIG. 65, 351

[56] References Cited
UNITED STATES PATENTS

| | | | |
|---|---|---|---|
| 256,037 | 4/1882 | Parker | 220/375 |
| 1,706,051 | 3/1929 | Auchincloss | 220/316 |
| 2,054,094 | 9/1936 | Morch | 220/366 |
| 2,063,967 | 12/1936 | Whittam | 215/307 |
| 2,397,440 | 3/1946 | Schwartz | 220/375 |
| 2,781,943 | 2/1957 | Carlstrom | 220/367 |
| 2,784,865 | 3/1957 | Rieke | 222/303 |
| 2,964,054 | 2/1960 | Weatherhead, Jr. | 220/85 P |
| 3,114,467 | 12/1963 | Montgomery | 215/307 |
| 3,184,091 | 5/1965 | Hoffman | 251/351 |
| 3,454,182 | 7/1969 | Morton | 220/374 |
| 3,456,679 | 7/1969 | Graham | 220/206 |
| 3,888,347 | 6/1975 | Kramer | 220/366 |

*Primary Examiner*—George E. Lowrance
*Assistant Examiner*—Allan N. Shoap
*Attorney, Agent, or Firm*—Fay & Sharpe

[57] ABSTRACT

A safety cap assembly for pressurized vessels comprising a filler member which has an externally threaded upper portion, an internally threaded closure cap containing at least one bleed hole extending through the cap, a gasket means mounted between the filler member and the cap, a safety means extending about the cap, and at least one circumferentially located venting channel positioned on one of the threaded portions of the filler member and closure cap. As a result of the inclusion of a bleed hole and a venting channel, an open path of communication for release of vessel pressure to the atmosphere is provided when the cap is sealingly disengaged from the gasket means.

1 Claim, 4 Drawing Figures

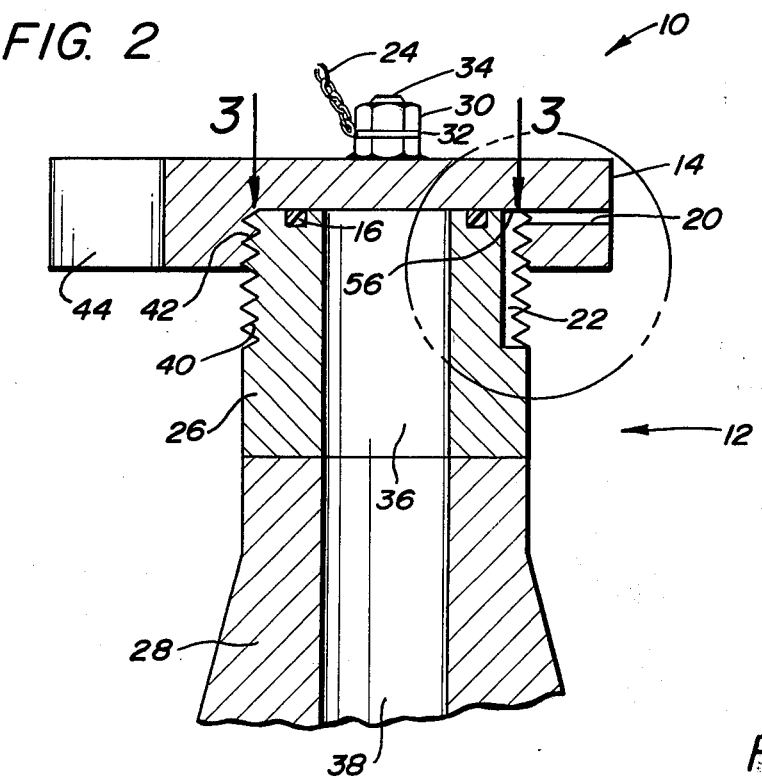
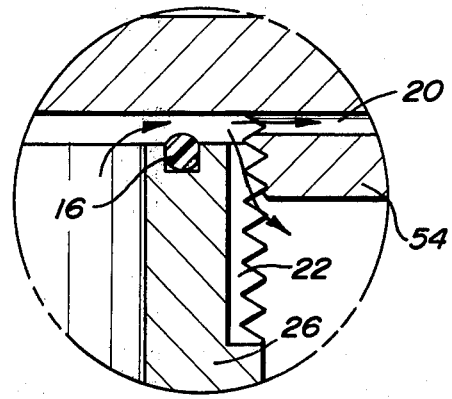
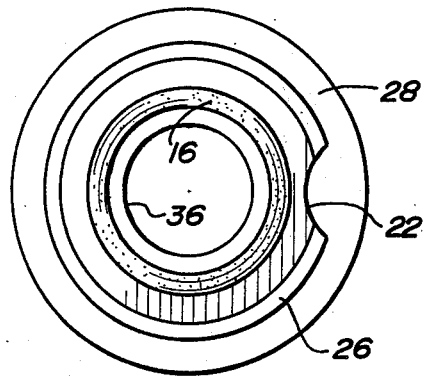

SAFETY CAP ASSEMBLY FOR PRESSURIZED VESSELS

BACKGROUND OF THE INVENTION

This invention is directed toward the art of safety caps for pressurized vessels and, more particularly, to an improved safety cap assembly for use on pressurized vessel equipment that is often used to clean the inside of plants having heavy residue.

Pressurized vessels are often provided with a closure cap or valve which, when removed, allows the tank to be filled with a liquid substance but which, when secured in place, allows the liquid within the tank to be pressurized. However, the removal of the closure cap subsequent to the pressurizing of the vessel may involve a sudden release of pressure as the cap is unscrewed. This sudden release of pressure creates a highly dangerous situation as it often results in the expulsion of some of the liquid from within the tank. Since the liquids used to clean plants having heavy residue are highly corrosive and, consequently, very harmful to the skin and eyes, it is quite apparent that should any of the liquid from within the tank be expelled by the sudden release of pressure, the person unscrewing the cap or opening the valve is subjected to serious bodily injury. In fact, there are instances in which persons unscrewing such closure caps or releasing a valve have lost their sight as a result of the cleaning liquid being expelled into their eyes by the sudden release of pressure.

Further, the sudden release of pressure upon removing the closure cap subsequent to the pressurization of the vessel is also highly dangerous in that it may result in the cap of the vessel being blown off. In effect, the cap may become a dangerous projectile or missile. The person unscrewing the closure cap is consequently subjected to the threat of serious bodily injury should the cap blow off the vessel as he unscrews it. In fact, there are instances in which persons unscrewing such closure caps have been injured. Such injuries range from minor cuts and bruises to serious injuries, such as the loss of an eye, the loss of a finger, broken limbs, our serious head injuries.

While pressurized vessels are often equipped with various devices for releasing vessel pressure to the atmosphere before the closure cap is removed, most vessels are not used in an extremely severe environment, such as that found in a food processing plant or with highly corrosive cleaning liquids. While there may be occasional problems with the operation of such pressure release devices in a normal environment, the operation of a food processing plant generates a considerable amount of dust, dirt and food residue, such as food protein and animal fat. In such dirty environments, past pressure release devices have often failed because the residue has impeded their functioning.

In fact, some of the failures of past pressure release devices have resulted from the dirt, dust and food residue generated during the cleaning process as well as corrosion by the cleaning liquid. Typically, the problem occurs because the spray of cleaning fluid generated by the pressurized vessel loosens and mixes with the dust, dirt and food residue of the food processing plant. This dust, dirt and food residue generated during the cleaning process then falls or splashes onto the cleaning equipment and becomes lodged on and in the pressure relief assembly of the cleaning equipment with the consequent result that bleed holes or safety valves included in the pressure relief assembly become inoperative.

Prior safety caps have used bleed holes to vent the vessel pressure to the atmosphere. Examples of venting to the atmosphere are U.S. Pat. Nos. 3,302,664 and 3,083,854 and German Pat. No. 1,072,127. However, as previously indicated, bleed holes by themselves tend to become blocked with dust, dirt or food residue or corrode shut when used on pressurized cleaning equipment in severe environments. Therefore, to prevent the problem of blocked bleed holes, the subject safety cap assembly has at least one bleed hole in addition to at least one venting channel. Consequently, should the bleed hole become filled with dirt or dust or corrode shut, the venting channel is available to alternatively vent the vessel pressure to the atmosphere as the closure cap is unscrewed.

In the past, it was common to use a cap assembly equipped with a lever arm operatively attached to the closure cap; consequently, the person opening the cap did not need to stand directly over the cap. However, if such cap was accidentally opened under pressure, it made little difference precisely where the person opening the cap was standing since the force of the suddenly release pressure would spray corrosive fluid in all directions.

The previous lever-arm type of fill port or cap assembly included a butterfly-type valve within the assembly. By its very design, it was able to open under high pressure and provided no safety factor. An air-operated safety interlock was often provided to prevent accidental opening of the fill port while the tank was pressurized. The corrosive cleaning fluids, however, often disabled the interlocks thus permitting accidental opening of the pressurized tank.

In short, the lever-arm type of fill port did not adequately protect against the possibility of the highly corrosive cleaning liquid being expelled onto the person opening it due to the sudden release of pressure.

This invention substantially solves the problems presented by the lever-arm type of assembly with three means. First, the subject safety cap assembly is equipped with a commercially available, externally threaded filler member which threadedly receives a commericially available closure cap. More specifically, the subject invention uses a Huber-Yale Figure 500, Series 150, four inch closure assembly although others are available. This closure cap and filler member are designed so that whenever the pressure within the vessel exceeds a predetermined pressure, the threads of the filler member and the threads of the closure cap interact in such a manner that it is not reasonably possible to unscrew the cap from the filler member.

Second, the subject safety cap assembly includes at least one bleed hole and at least one venting channel which are directed away from the face of the person unscrewing the safety cap. Therefore, if for some reason there is a sudden release of pressure as the cap is unscrewed, the corrosive cleaning liquid will be expelled in a direction away from the face of the person unscrewing the cap, thereby preventing any injury to such person.

Third, the subject assembly is equipped with a safety cage which extends about the closure cap and prevents the cap from becoming a dangerous projectile should the cap be blown off the filler member.

BRIEF DESCRIPTION OF THE DRAWINGS

FIG. 2 is a partial view of the subject safety cap assembly in cross-section;

FIG. 3 is a sectional view taken on line 3—3 of FIG. 2;

FIG. 4 is an enlarged, partial view of the safety cap assembly in section.

DETAILED DESCRIPTION OF THE DRAWINGS

Figure 1:
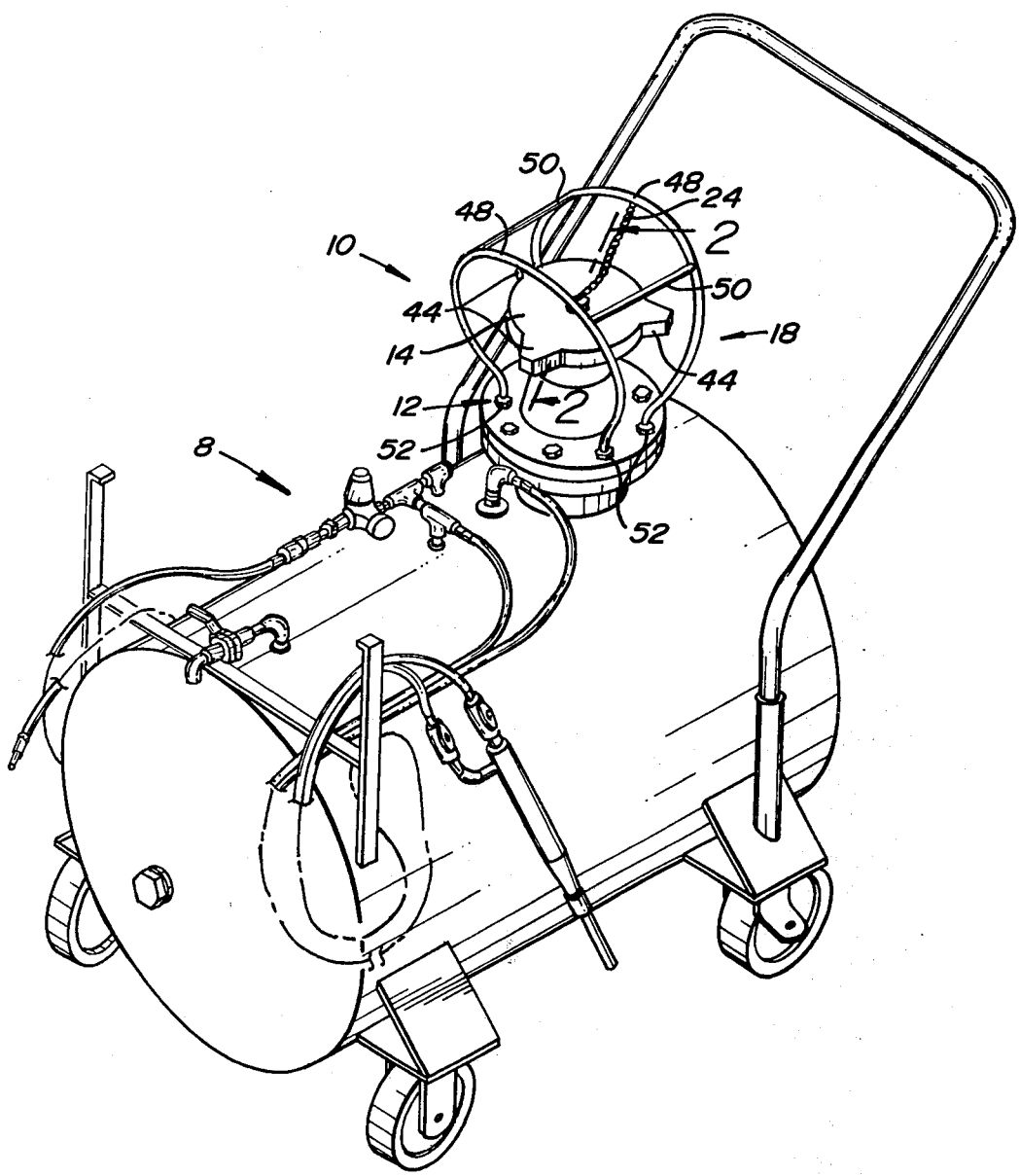
FIG. 1 is an isometric view of a pressure vessel with the subject safety cap assembly mounted thereon.

Referring more particularly to the drawings wherein the showings are for the purpose of illustrating the preferred embodiment of the invention only and not for the purpose of limiting same, FIG. 1 illustrates the overall arrangement of the pressure vessel 8 with the safety cap assembly 10 attached thereto.

In general, as best shown in FIGS. 1 and 2, the safety cap assembly 10 is shown as including a filler member 12 having a lower portion 28 for attachment to the pressure vessel 8. In the preferred embodiment of this invention, filler member lower portion 28 is illustrated as being bolted to the pressure vessel 8 but any other suitable method of joining could be used. Bolted or otherwise suitably joined to the filler member lower portion 28 is a filler member upper portion 26. When the upper filler member 26 and the lower filler member 28 are joined as described, their respective central bores 36 and 38 are axially aligned and form a path through which liquid may be introduced into the pressure vessel 8 by way of a corresponding orifice in the pressure vessel 8.

As best shown in FIG. 2, the filler member 26 has external threads 40 while the closure cap 14 is internally threaded at 42 such that the cap 14 is threadedly received on the filler member 26. In the preferred embodiment, the threads 40 of the filler member 26 and the cap 14 are designed so that whenever the pressure within the vessel 8 exceeds a predetermined pressure, the threads of the filler member 26 and the threads of the cap 14 interact in such a manner that it is not reasonably possible to unscrew the cap 14 from the filler member 26.

Located between the filler member 26 and the cap 14 is gasket means 16. As shown in FIG. 2, the gasket means 16 is carried within gasket slot 17, but it is easily understood that the gasket means 16 could also be placed within a gasket slot in cap 14. Gasket 16 functions to establish sealing engagement between the filler member 26 and cap 14 when the cap 14 is tightened on the filler member 26. The cap 14 need only be fastened hand tight to act as a safety factor.

Included in the cap 14 is at least one bleed hole 20 which functions as a vent to the atmosphere for release of vessel pressure. As shown by the arrows in FIG. 4, when the cap 14 sealingly disengaged from the gasket means 16, the vessel pressure can pass between the gasket means 16 and the cap 14 and out bleed hole 20 to the atmosphere. In the preferred embodiment, the cap 14 has three bleed holes equally spaced within the cap 14 at 120° intervals. As seen in FIGS. 2 and 4, the bleed holes 20 extend through the skirt 54 of the cap 14 in a generally horizontal direction. Further, the bleed holes 20 are located in close proximity to the interior surface 56 of the dome of the cap 14. Thus, should one bleed hole become blocked with dirt, dust and food residue, venting could alternatively occur through the remaining unblocked bleed holes. Also, due to the fact that the bleed holes 20 extend through the skirt of the cap 14 in a generally horizontal direction, should any cleaning liquid be expelled from the tank as the cap 14 is unscrewed, it will be directed away from the face of the person unscrewing the cap. Consequently, the possibility of injury to the person unscrewing the cap, as a result of the highly corrosive liquid being expelled into the eyes of such person, is eliminated.

Further, in the event that the bleed holes 20 should become blocked by dirt, dust and food residue from the food processing plant environment, an additional venting means is provided by way of venting channel 22. As shown in FIGS. 2 and 3, the venting channel 22 is circumferentially positioned on the threaded portion of the filler member upper portion 26 and extends in a generally downward direction. Obviously, though, the venting channel 22 could alternatively be positioned on the threaded portion of cap 14.

In the preferred embodiment, the channel 22 has a depth greater than the root depth of threads 40 in filler member 26. That is, the depth of the channel 22 is greater than the distance from the outermost part of the threads 40 to the innermost part of the threads 40. However, quite obviously, for venting purposes, this is not an absolute requirement. As shown by the arrows in FIG. 4, the channel 22 performs its venting function in the same manner as the bleed holes 20 and, consequently, the expulsion of cleaning liquid, if any, is directed away from the person unscrewing the cap 14 thereby preventing the possibility of injury to such person by the highly corrosive cleaning liquid.

As best shown in FIG. 1, safety means 18 is attached to the filler member 28 by bolts 52, welding or other suitable means. In the preferred embodiment, the safety means 18 includes ring members 48 and cross members 50. The ring members 48 and the cross members 50 are joined together by suitable means such as welding and are designed and arranged such that the cap 14 is disposed within the region circumscribed by the safety means 18. Consequently, if for some reason the cap 14 should blow off the filler member 12, the safety means 18 will restrain the cap 14 since the ring members and the cross members form a grid having open spaces above the cap which are not sufficient size for the cap to pass therethrough.

As yet another safety feature, a chain 24 is operatively attached between the cap 14 and the safety means 18. In the preferred embodiment, as best seen in FIGS. 1 and 2, a chain bolt 34 is welded to the top of the cap 14 while a chain link 32 is placed on the bolt 34 and secured in place by a chain nut 30. The chain 24 is also attached to the ring member 48. At the ring member 48, the chain 24 is welded in place or fastened by any other suitable means. From such a construction, it can be seen that should the cap 14 blow off the filler member 12, the chain 24 can additionally act to restrain the flight of the cap 14. The chain 24 is also useful to hold the cap 14 while filling the tank.

Understandably, safety means 18 could be formed in a variety of configurations different than that disclosed and could also be attached to a variety of places other than that disclosed, while still performing the function of restraining the flight of the cap 14 should it blow off the filler member 12 for some reason.

Similarly, the chain 24 could be attached to a number of different places and in a number of different ways than those disclosed while retaining its function of restraining the flight of the cap 14 should the cap 14 blow off the filler member 12.

Operation

The operation of the safety cap assembly 10 is illustrated in FIGS. 2 and 4. In FIG. 2, the cap 14 is in a closed position with gasket 16 establishing sealing engagement between the cap 14 and the filler member 12. In this condition, pressure in the vessel 8 is prevented from escaping.

The first safety feature of the safety cap assembly 10 includes an externally threaded filler member 12 and an internally threaded closure cap 14, threadedly received thereon, wherein the threads of the filler member 12 and the cap 14 are designed so that whenever the pressure within the pressurized vessel 9 exceeds a predetermined pressure, the threads of the filler member 12 interact with the threads of the cap 14 in such a manner that it is not reasonably possible to unscrew the cap 14 from the filler member 12. More specifically, in the preferred embodiment, the cap cannot be unscrewed until the pressure within the vessel 8 is less than approximately 30 psi.

As cap 14 is unscrewed, gasket 16 separates from the cap 14 thereby breaking the sealing engagement between the cap 14 and the filler member 12. The pressurized air from within the vessel 8 will then flow over the gasket 16 and out the bleed holes 20 and the venting channel 22 in a direction generally directed away from the person unscrewing the cap. Further, should the bleed holes 20 become blocked with dirt, dust and food residue, the pressurized air can alternatively flow out the venting channel 22 and vice versa.

Due to the great amount of dirt, dust and food residue generated during the cleaning process of a food plant, it is further necessary to provide additional safety features should the bleed holes and venting channel(s) become blocked. Such additional safety features prevent the cap 14 from being uncontrollably blown off the filler member 12. In the subject invention, such additional safety features take two forms and can best be seen in FIG. 1.

The first form is a safety means 18 which extends about the cap 14 such that the cap 14 is disposed within the region circumscribed by the cage-type safety means 18. With a safety means of this type, the cap 14 is prevented from projecting beyond the confines of the safety means 18 irrespective of the direction of flight of the cap 14.

The second additional safety feature takes the form of a chain 24 which is operatively connected between the cap 14 and the safety means 18. With this feature, the chain 24 will additionally restrain the flight of the cap 14 so that the cap 14 will not seriously injure the person who is unscrewing it.

The invention has been described in great detail sufficient to enable one of ordinary skill in the pressurized safety cap art to make and use same. Obviously, modifications and alterations of the preferred embodiment will occur to others upon a reading and understanding of the specification. It is my intention to include all such modifications and alterations as part of my invention insofar as they come within the scope of the appended claims.

I claim:

1. A safety cap assembly comprising:

a filler member having a lower portion for attachment to a pressurizable vessel and an upper portion, a complementary closure cap received on said filler member upper portion, said cap having an elongated skirt portion and a transverse planar portion, thread means on said filler member and said closure cap skirt for non-releasably interacting such that said cap cannot be normally unscrewed from said filler member when said vessel is pressurized;

gasket means mounted between said filler member upon portion and said cap planar portion for establishing sealing engagement between said filler member and said cap;

means for achieving the release of vessel pressure when said cap is unscrewed including a plurality of bleed holes spaced within said cap adjacent said cap planar portion and extending through said skirt of said cap;

at least one circumferentially located venting channel positioned at the externally threaded upper portion of said filler member which has a greater depth than the root depth of the threads of said filler member;

a cage-type safety means operatively attached to said filler member lower portion and extending about said cap with said cap in place such that said cap is disposed within the region circumscribed by said safety means, said cage-type safety means including ring members and connecting bar members forming a grid having open areas smaller than the cap in order to restrain the cap if it should be expelled from the filler member; and a chain operatively attached to and extending between said closure cap and safety means.

* * * * *